United States Patent
Oga (10) Patent No.: US 10,202,055 B2
(45) Date of Patent: Feb. 12, 2019

(54) SEAT DEVICE

(71) Applicant: Honda Motor Co.,Ltd., Tokyo (JP)

(72) Inventor: Yuma Oga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/450,033

(22) Filed: Mar. 6, 2017

(65) Prior Publication Data

US 2017/0259710 A1    Sep. 14, 2017

(30) Foreign Application Priority Data

Mar. 8, 2016 (JP) ................................ 2016-044720

(51) Int. Cl.
*B60N 2/28* (2006.01)
(52) U.S. Cl.
CPC .................................. *B60N 2/2893* (2013.01)
(58) Field of Classification Search
CPC ..... B60N 2/2887; B60N 2/289; B60N 2/2893
See application file for complete search history.

(56) References Cited

U.S. PATENT DOCUMENTS

| | | | | |
|---|---|---|---|---|
| 6,416,128 B1 * | 7/2002 | Fujii | .................... | B60N 2/2893 297/218.1 |
| 7,281,763 B1 * | 10/2007 | Hayashi | ............... | B60N 2/2893 297/253 |
| 7,427,103 B2 * | 9/2008 | Weber | ................. | B60N 2/2893 297/188.2 |
| 8,328,280 B2 * | 12/2012 | Parker | ................. | B60N 2/2887 297/236 |

FOREIGN PATENT DOCUMENTS

DE    102006060121    6/2008
JP    3462142    11/2003

OTHER PUBLICATIONS

"Office Action of Japan Counterpart Application," with machine English translation thereof, dated Sep. 26, 2017, p. 1-p. 7.

* cited by examiner

*Primary Examiner* — Philip F Gabler
(74) *Attorney, Agent, or Firm* — JCIPRNET (57) ABSTRACT

The seat device includes: wires (31), fixed at a car body frame, and adapted to fix a child seat; opening portions (33), disposed at a right seat (13A), and adapted to enable the child seat to be connected to the wires (31); and covering portions (35), a base end of each being mounted at the right seat (13A), a front end being a free end, and the covering portions (35) covering the opening portions (33). Each of the covering portions (35) includes a fixing portion (36). The fixing portion (36) is disposed at a front end of the covering portion (35), and is clamped between the right seat (13A) and a wire (31) so as to be fixed.

9 Claims, 7 Drawing Sheets

SEAT DEVICE

CROSS-REFERENCE TO RELATED APPLICATION

This application claims the priority benefit of Japan application serial no. 2016-044720, filed on Mar. 8, 2016. The entirety of the above-mentioned patent application is hereby incorporated by reference herein and made a part of this specification.

BACKGROUND OF THE DISCLOSURE

1. Field of the Disclosure

The disclosure relates to a seat device.

2. Description of Related Art

As regards seats for automobiles, the following seat for an automobile including a wire exists, the wire being adapted to fix a child seat corresponding to International Standards Organization FIX (ISOFIX) to a seat for an automobile. In the seat for an automobile, an opening portion adapted to enable a hook portion of the child seat to engage with the wire is provided. To prevent a decrease in beauty of appearance, the seat for an automobile includes a covering portion for covering the opening portion.

For example, Japanese Patent No. 3462142 discloses the following structure: a cover body (the covering portion) is provided, a mounting unit (the hook and loop fastener) is provided, the cover body (the covering portion) openably and closably covers a front opening (the opening portion) from a front side of the front opening (the opening portion) of a through passage provided with a block portion (the wire), and the mounting unit (the hook and loop fastener) enables a protruded end portion of the cover body for covering the opening of the through passage to be freely inserted into and removed from a gap between a rear end portion of a seat cushion and a lower end portion of a seat backrest, and enables the protruded end portion of the cover body inserted in the gap to be freely mounted onto and detached from the rear end portion of the seat cushion or the lower end portion of the seat backrest.

SUMMARY OF THE DISCLOSURE

Problem to be Solved by the Disclosure

However, as regards the existing structure, the mounting unit needs to be disposed at the protruded end portion of the cover body, the rear end portion of the seat cushion, or the lower end portion of the seat backrest, and therefore, the costs of components are increased. Therefore, the prior art can be improved in an aspect of reducing costs.

Therefore, the disclosure provides a low-cost seat device.

Technical Means for Solving the Problem

The seat device according to the disclosure includes: wires (for example, wires 31 in an embodiment), fixed at any one of a seat frame and a car body (for example, a car body floor 11 in the embodiment), and adapted to fix a child seat; opening portions (for example, the opening portions 33 in the embodiment) disposed at the seat (for example, a right seat 13A of the embodiment), and adapted to enable the child seat to be connected to the wires; and covering portions (for example, covering portions 35, covering portions 135, and covering portions 235 of the embodiments), one end of each being mounted at the seat, the other end being a free end, and the covering portions covering the opening portions, where each of the covering portions includes a fixing portion (for example, a fixing portion 36, a fixing portion 136, and a fixing portion 236 in the embodiments), each of the fixing portions (for example, the fixing portion 36, the fixing portion 136, and the fixing portion 236 in the embodiments) being disposed at the other end, and being clamped between the seat and a wire and therefore being fixed.

According to the disclosure, each of the covering portions includes a fixing portion, and the fixing portion is disposed at the other end functioning as the free end, and is clamped between the seat and a wire and therefore is fixed. Therefore, different from using a mounting unit functioning as another component in the prior art, in the disclosure, a covering portion can be used to cover an opening portion as long as a fixing portion is clamped and held between a seat and a wire. Therefore, a low-cost seat device can be provided.

In the seat device, preferably, the opening portions are separately disposed at two sides of the seat in a car width direction, and the covering portions are separately formed in a manner of covering the opening portions.

According to the disclosure, the covering portions separately cover the opening portions, and therefore, this structure uses less material for forming the covering portions as compared with a structure that an integral covering portion covers opening portions. Therefore, a low-cost seat device can be provided.

In the seat device, preferably, each of the covering portions is made of a skin material (for example, a skin material 37 in the embodiment), and the fixing portion is formed by folding back a front end portion of the skin material.

According to the disclosure, the front end of the skin material is folded back, and therefore, the fixing portion is formed to be thicker than the portions other than the fixing portion in the covering portion. Therefore, the fixing portion is clamped between the seat and the wire and is securely fixed. Therefore, a seat device capable of securely covering the opening portions can be provided.

In the seat device, preferably, each of the covering portions includes an elastic material (for example, an elastic material 138 in the embodiment) at the other end, and each of the fixing portions includes a constricted neck portion (for example, a constricted neck portion 139 in the embodiment) that is constricted when the elastic material is sewed.

According to the disclosure, the constricted neck portion is included, and therefore, the constricted neck portion of the fixing portion can be blocked by the wire. Moreover, the constricted neck portion can be easily formed by sewing the elastic material disposed at the other end of the covering portion. Therefore, the following structure can be easily implemented, and the structure enables the fixing portion to be clamped between the seat and the wire and therefore is securely fixed. Therefore, a seat device capable of securely covering the opening portions can be provided.

In the seat device, preferably, each of the fixing portions functions as another component to be mounted at a body portion of one of the covering portions.

According to the disclosure, the preformed fixing portion can be mounted at the body portion of the covering portion. Therefore, the fixing portion can be effectively manufactured. Therefore, a low-cost seat device can be provided.

Effects of the Disclosure

According to the disclosure, each covering portion includes a fixing portion, and the fixing portion is disposed at the other end of the covering portion functioning as a free end, and is clamped between a seat and a wire and therefore is fixed. Therefore, different from using a mounting unit functioning as another component in the prior art, in the disclosure, a covering portion can be used to cover an opening portion as long as a fixing portion is clamped and held between the seat and the wire. Therefore, a low-cost seat device can be provided.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present exemplary embodiments of the disclosure, examples of which are illustrated in the accompanying drawings. Wherever possible, the same reference numbers are used in the drawings and the description to refer to the same or like parts.

Embodiments of the disclosure are described on the basis of the accompanying drawings. Further, directions such as front, back, above, below, left, and right in the following description are the same as directions in an automobile, unless otherwise denoted. In addition, in the figures, an arrow UP indicates up, an arrow FR indicates front, and an arrow LH indicates left.

Embodiments

Figure 1:
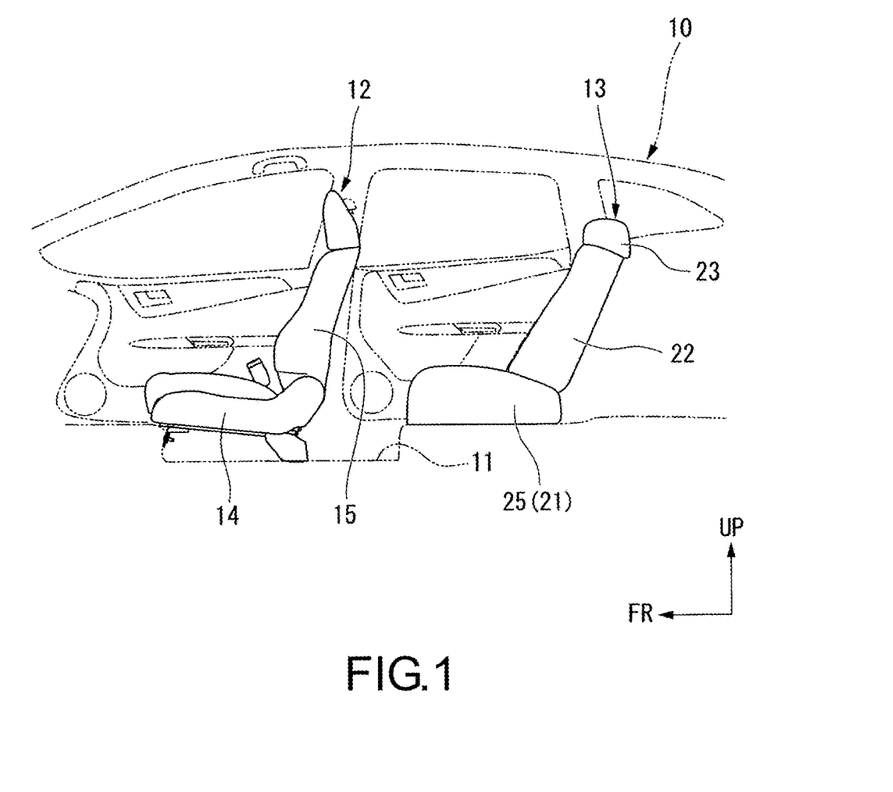
FIG. 1 is a schematic view of an automobile according to an embodiment.

FIG. 1 is a schematic view (side view) of an automobile according to an embodiment.

As shown in FIG. 1, on a car body floor 11 (a car body) of an automobile 10, a front row seat 12 and a back row seat 13 are arranged in a spaced manner along a direction from front to back.

The front row seat 12 includes a seat cushion 14, and a seat backrest 15 that can be obliquely connected to a rear end portion of the seat cushion 14, and the front row seat 12 is fixed at the car body floor 11 in a front-back slidable manner. Further, although not shown in the figure, there are two front row seats 12 that are separately disposed at a left side and a right side of the automobile.

Figure 2:
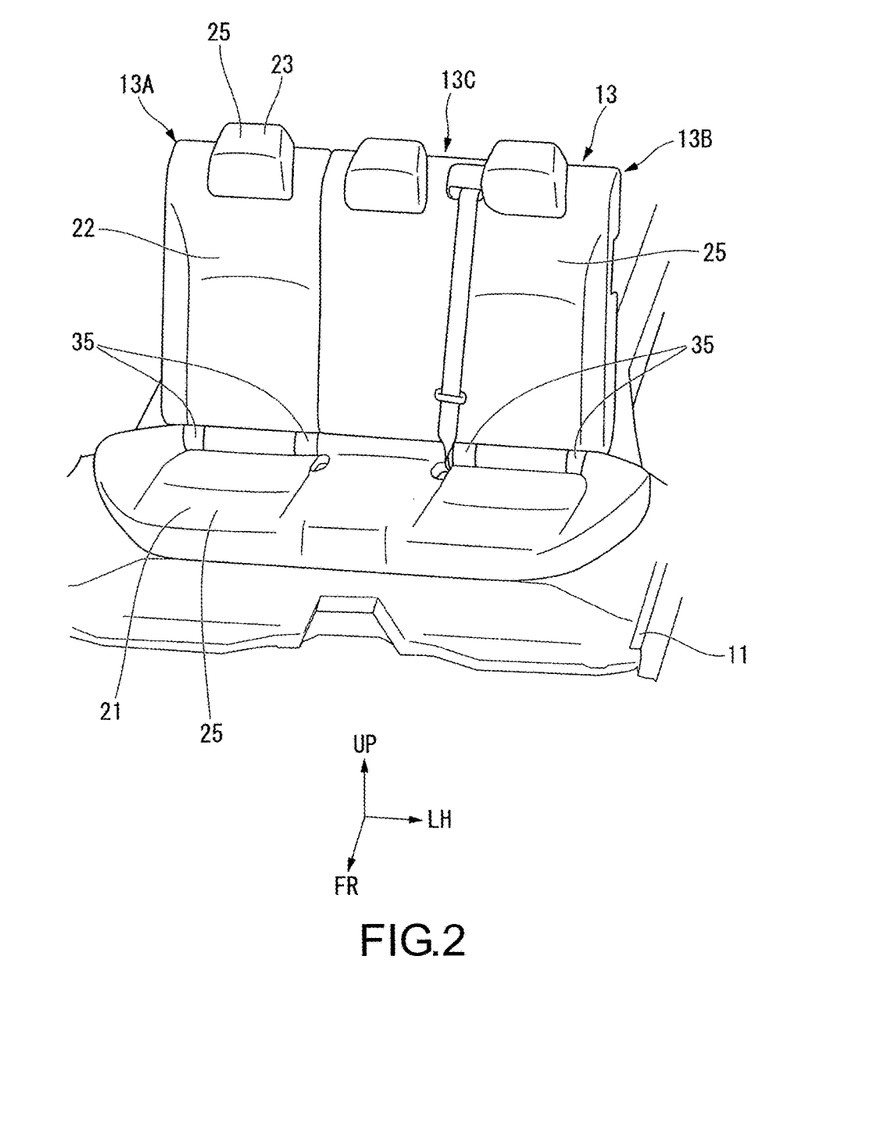
FIG. 2 is a perspective view of a back row seat according to the embodiment.

FIG. 2 is a perspective view of a back row seat according to the embodiment. Further, FIG. 2 shows a state that covering portions 35 described later block opening portions 33 (referring to FIG. 3).

As shown in FIG. 2, the back row seat 13 in this embodiment may be designed as a bench seat that can allow three passengers to sit, and is formed in an entire car width direction in the automobile. Specifically, the back row seat 13 mainly includes: a seat cushion 21, extending along the entire car width direction; a seat backrest 22, obliquely connected to a rear end portion of the seat cushion 21; and a plurality of (three in the example shown in the figure) headrests 23 that are disposed, in a spaced manner, at an upper portion of the seat backrest 22 along the car width direction. Each of the seat cushion 21, the seat backrest 22, and the headrests 23 includes a frame (a seat frame) (not shown), a filling material 24 (referring to FIG. 4), and a seat cover 25.

Here, in a state that three passengers sit on the back row seat 13, a portion of the back row seat 13 on which a right passenger sits is set as a right seat 13A, and a portion on which a left passenger sits is set as a left seat 13B, and a portion on which a middle passenger sits is set as a middle seat 13C. The right seat 13A and the left seat 13B are symmetrically formed with the middle seat 13C being disposed therebetween. Therefore, in the following description, unless specifically denoted, a seat device adopted by the right seat 13A is used as an example for description.

Figure 3:
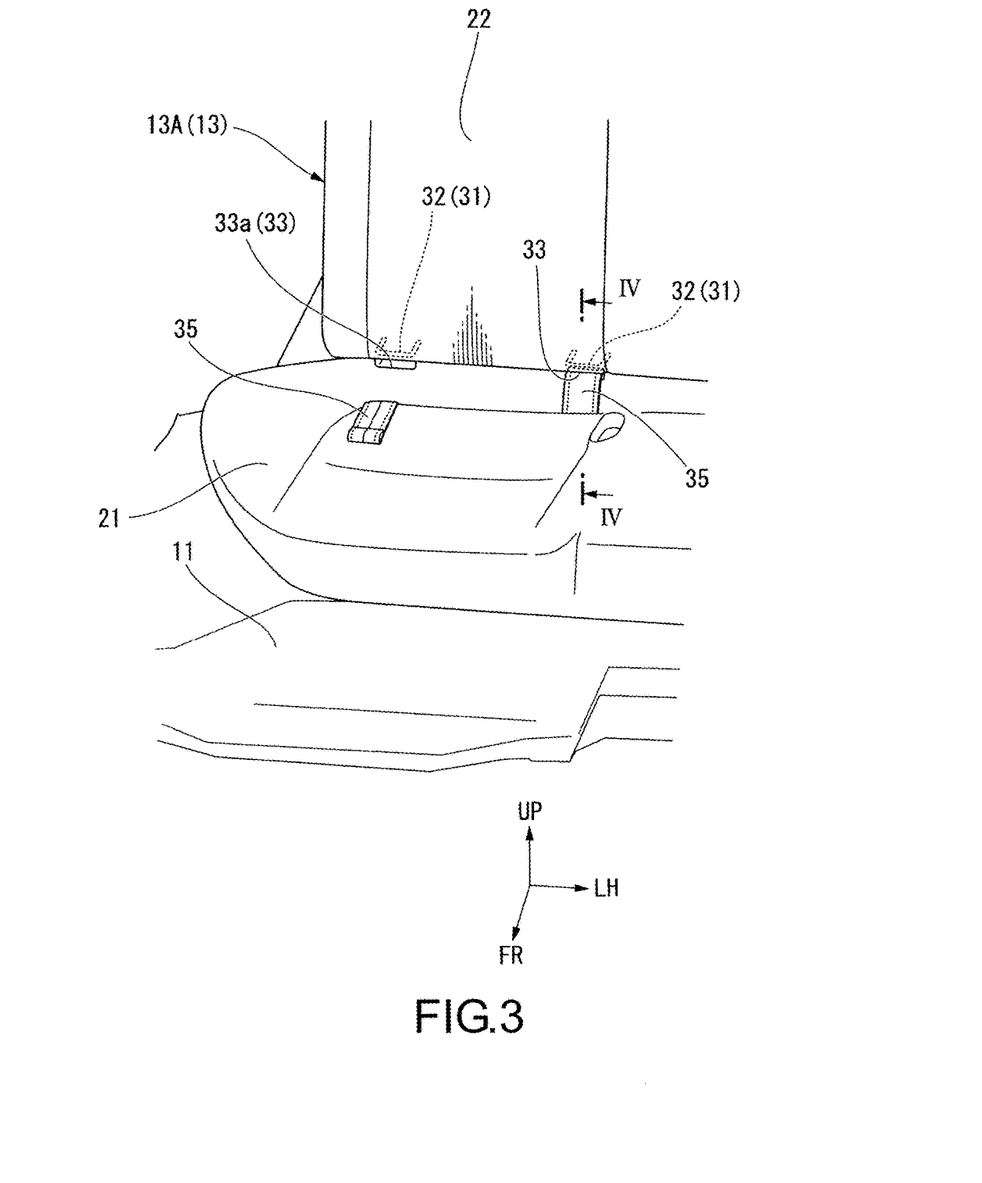
FIG. 3 is a front view of a right seat according to the embodiment.
Figure 4:
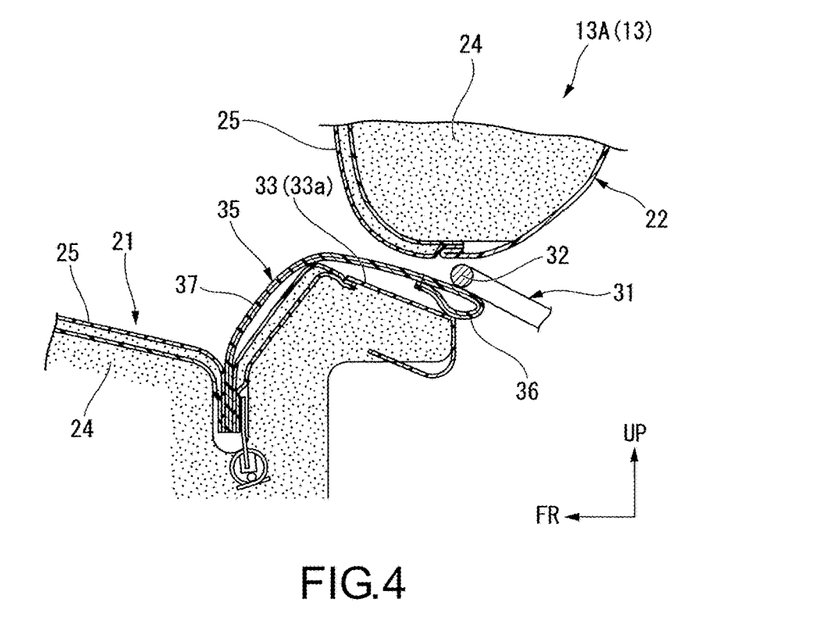
FIG. 4 is a cross sectional view of FIG. 3 taking along a line IV-IV.

FIG. 3 is a front view of a right seat according to the embodiment. FIG. 4 is a cross sectional view of FIG. 3 taking along a line IV-IV. Further, FIG. 3 shows a state that a covering portion 35 at the right side enables an opening portion 33 to be opened.

As shown in FIG. 3 and FIG. 4, the right seat 13A includes the seat cushion 21, the seat backrest 22, the headrest 23 (referring to FIG. 2), and a pair of wires 31 fixed at the car body floor 11.

For example, the pair of wires 31 is adapted to fix a child seat corresponding to ISOFIX. The wires 31 are respectively disposed between the seat cushion 21 at the left side and the seat backrest 22 and between the seat cushion 21 at the right side and the seat backrest 22 of the right seat 13A. A block portion 32 extending along the car width direction is formed at a front end portion of each wire 31. Further, the wires 31 may be fixed at a frame of the seat cushion 21, or a frame of the seat backrest 22.

As shown in FIG. 3, a pair of opening portions 33 that is open towards the front are provided in the right seat 13A. The pair of opening portions 33 corresponds to the wires 31, and are adapted to enable the child seat to be connected to the block portions 32 of the wires 31. Each opening portion 33 is formed by a recess 33a at an upper edge of a rear portion of the seat cushion 21, and a lower edge of the seat backrest 22. An inner side of each opening portion 33 is provided with a block portion 32 of a wire 31.

In addition, as shown in FIG. 2 to FIG. 4, a pair of covering portions 35 for covering the opening portions 33 in a manner of capable of enabling the opening portions 33 to be opened and closed is mounted on the right seat 13A. The pair of covering portions 35 corresponds to the opening portions 33, and extends from an upper surface of the seat cushion 21. Each covering portion 35 imitates, by using a skin material 37, such as a cloth material (fabric), synthetic leather, or natural leather, the same as that of the seat cover 25, a shape of an outer surface of the seat cushion 21 to form a rectangular shape or a trapezoid shape. The width of each covering portion 35 in the car width direction is the same as the width of each opening portion 33 in the car width direction.

As shown n FIG. 4, a base end of each covering portion 35 is mounted, at the front of an opening portion 33, onto the seat cushion 21 by sewing or the like. A front end of each covering portion 35 is a free end, and can be inserted into an opening portion 33.

Each covering portion 35 includes a fixing portion 36 disposed at the front end. The fixing portion 36 is formed thicker than the portions other than the fixing portion 36 in the covering portion 35. The thickness of the fixing portion 36 may be greater than the distance between the seat cushion 21 and a block portion 32 of a wire 31, and the distance between a lower end portion of the seat backrest 22 and the block portion 32 of the wire 31. Therefore, the fixing portion 36 can be clamped between the seat cushion 21 and the block portion 32 of the wire 31, and therefore be fixed. Further, the fixing portion 36 may be clamped between the lower end portion of the seat backrest 22 and the block portion 32 of the wire 31, and therefore be fixed. Moreover, the covering portion 35 can cover the opening portion 33 by inserting the front end into the opening portion 33 and fixing the fixing portion 36 between the right seat 13A (the seat cushion 21 or the seat backrest 22) and the block portion 32 of the wire 31. Further, the wires 31, the opening portions 33, and the covering portions 35 form the seat device of this embodiment.

Figure 5:
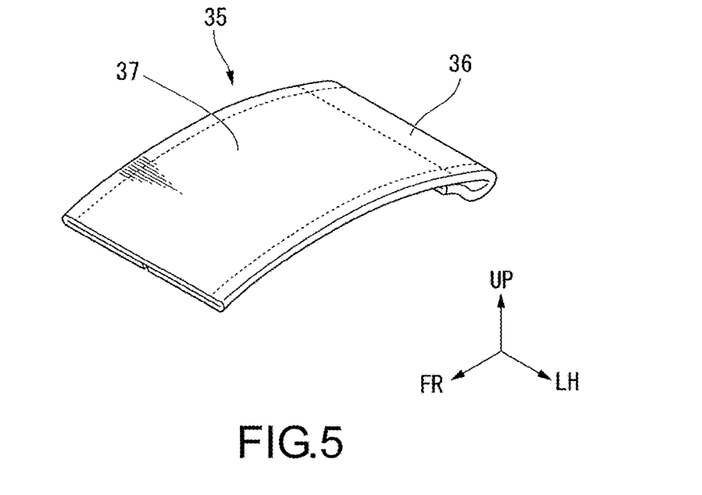
FIG. 5 is a perspective view of a covering portion according to the embodiment.

FIG. 5 is a perspective view of a covering portion according to the embodiment.

Each covering portion 35 is formed by folding and sewing the skin material 37. Specifically, a manner of enabling a left end surface and a right end surface of the skin material 37 to get close and move towards each other is used to respectively fold a left side and a right side toward a reverse side, that is, a back side, of an appearance surface, and a left end and a right end are respectively sewed along creases. Moreover, a front end portion of the skin material 37 is folded back towards the back side, and is sewed along the car width direction in a manner of being sewed along a front edge. Therefore, a front end of the covering portion 35 forms a fixing portion 36 that is thicker than other portions.

In this way, this embodiment adopts the following structure: the covering portion 35 includes the fixing portion 36, and the fixing portion 36 is disposed at the front end of the covering portion 35, and is clamped between the right seat 13A and the block portion 32 of the wire 31 and therefore is fixed.

According to the structure, different from using a mounting unit, such as a hook and loop fastener, functioning as another component in the prior art, the covering portion 35 can cover the opening portion 33 as long as the fixing portion 36 is clamped and held between the right seat 13A and the wire 31. Therefore, a low-cost seat device can be provided.

In addition, the covering portions 35 respectively cover the opening portions 33, and therefore, this structure uses less material, such as the skin material, for forming the covering portions 35 as compared with a structure that an integral covering portion covers the opening portions 33. Therefore, a low-cost seat device can be provided.

In addition, the fixing portion 36 is formed by folding back the front end of the skin material 37, and therefore, the fixing portion 36 is thicker than the portions other than the fixing portion 36 in the covering portion 35. Therefore, the fixing portion 36 is clamped between the right seat 13A and the wire 31 and is securely fixed. Therefore, a seat device capable of securely covering the opening portions 33 can be provided.

In addition, the fixing portion 36 can be clamped between the seat cushion 21 and the block portion 32 of the wire 31, and therefore be fixed. The wire 31 is disposed between the seat cushion 21 and the seat backrest 22, and therefore, clamping the fixing portion 36 between the seat cushion 21 and the block portion 32 can prevent a sliding contact between the lower end portion of the seat backrest 22 and the fixing portion 36 when the seat backrest 22 is inclined. Therefore, the covering portion 35 can be prevented from being rolled caused by the fixing portion 36 falling from a position between the right seat 13A and the wire 31 when the seat backrest 22 is inclined.

First Variant Example of the Embodiment

Figure 6:
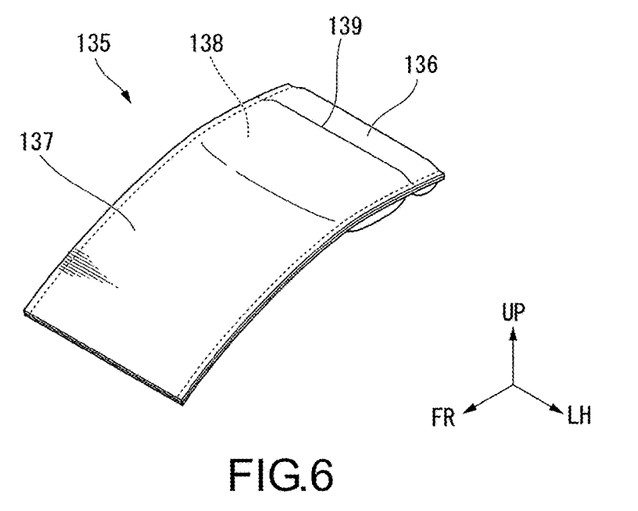
FIG. 6 is a perspective view of a covering portion according to a first variant example of the embodiment.
Figure 7:
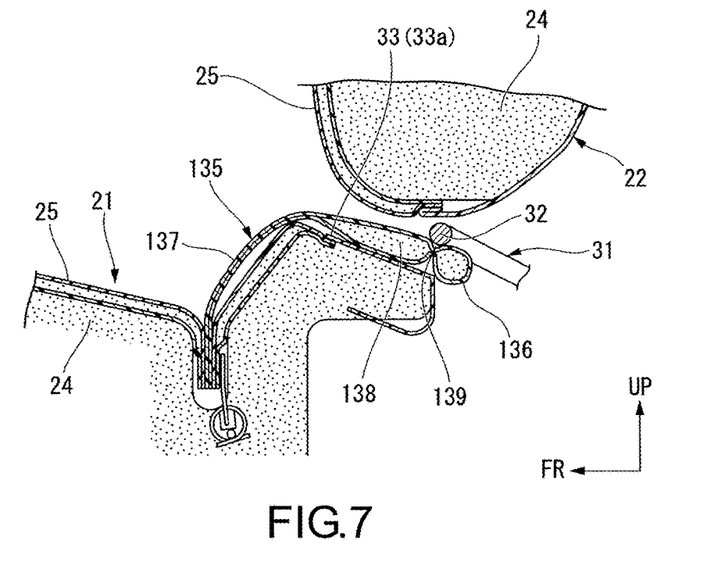
FIG. 7 is a view illustrating the covering portion according to the first variant example of the embodiment, and is equivalent to a cross sectional view of a portion of FIG. 3 taking along the line IV-IV.

Subsequently, a covering portion 135 according to the first variant example of the embodiment is described.

FIG. 6 is a perspective view of a covering portion according to a first variant example of the embodiment. FIG. 7 is view illustrating the covering portion according to the first variant example of the embodiment, and is equivalent to a cross sectional view of a portion of FIG. 3 taking along the line IV-IV.

In the embodiment shown in FIG. 5, the skin material 37 is folded back at the front end of the covering portion 35, so as to form the thick fixing portion 36. As compared with this, the first variant example of the embodiment shown in FIG. 6 differs from the embodiment in that: at the front end of the covering portion 135, an elastic material 138 is accommodated in the skin material 137, so as to form the thick fixing portion 136. Further, like reference numbers are attached to structures the same as those in the embodiments of FIG. 4 and FIG. 5, and detailed description is omitted (like reference numbers are used in the following variant example for same structures).

As shown in FIG. 6 and FIG. 7, the covering portion 135 is formed by a piece of skin material 137 that is sewed into a bag, and an elastic material 138 that is accommodated in the skin material 137. For example, the skin material 137 is a material the same as that of a seat cover 25, such as a cloth material (fabric), synthetic leather, and natural leather. First, the skin material 137 is strip shaped, the skin material 137 is folded back along a crease at a direction of a short edge, and two overlapped sides are sewed, so as to form a bag shape. The crease of the skin material 137 is located at a front end of the covering portion 135. The elastic material 138 is made of an elastic material such as polyurethane foam, and is disposed at the front end of the covering portion 135. Therefore, the front end of the covering portion 135 is thicker than other portions.

The front end of the covering portion 135 becomes a fixing portion 136 that is clamped between a seat cushion 21 and a block portion 32 of a wire 31 and therefore is fixed. The fixing portion 136 includes a constricted neck portion 139, and the constricted neck portion 139 is constricted in a state that the elastic material 138 and the skin material 137 are sewed. The constricted neck portion 139 is disposed at a portion of the fixing portion 136 that abuts the block portion 32 of the wire 31. The elastic material 138 is elastically deformed, and the skin material 137 wrapping the elastic material 138 is sewed along a car width direction, so that the constricted neck portion 139 forms a partially constricted shape.

In this way, according to this variant example, the fixing portion 136 includes the constricted neck portion 139, and therefore, the constricted neck portion 139 of the fixing portion 136 can be blocked by the block portion 32 of the wire 31. Moreover, the constricted neck portion 139 can be easily formed by sewing the elastic material 138 disposed at the front end of the covering portion 135. Therefore, the following structure can be easily implemented, and the structure enables the fixing portion 136 to be clamped between the right seat 13A and the block portion 32 of the wire 31 and therefore to be securely fixed. Therefore, a seat device capable of securely covering the opening portions 33 can be provided.

Figure 8:
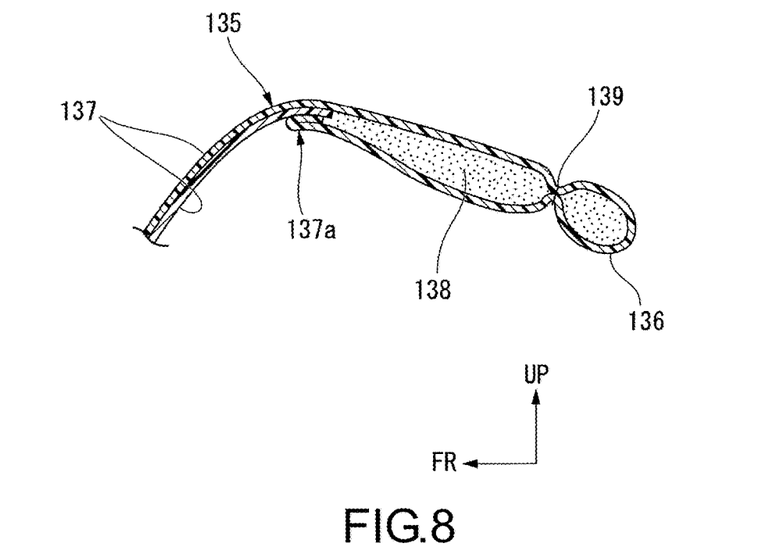
FIG. 8 is a view illustrating another example of the covering portion according to the first variant example of the embodiment, and is equivalent to a sectional view of a portion of FIG. 3 taking along the line IV-IV.

Further, a plurality of pieces of skin materials 137 may be sewed to form an integral part. In this case, as shown in FIG. 8, a sewed portion 137a is disposed at a back side of the covering portion 135, and therefore, a decrease in beauty of appearance of the right seat 13A can be prevented.

Second Variant Example of the Embodiment

Figure 9:
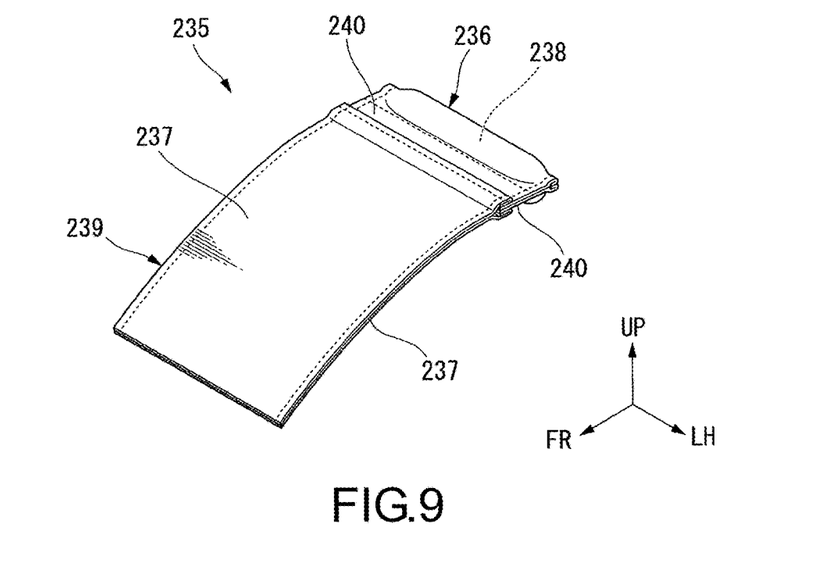
FIG. 9 is a perspective view of a covering portion according to a second variant example of the embodiment.
Figure 10:
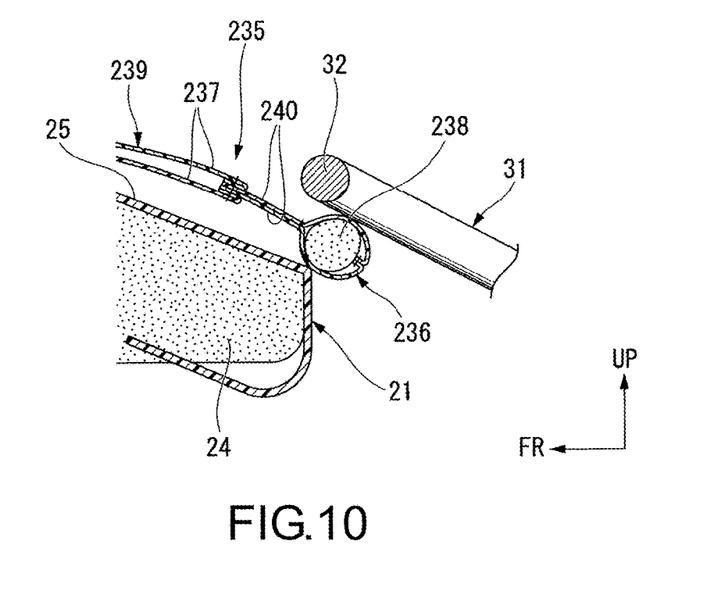
FIG. 10 is a view illustrating the covering portion according to the second variant example of the embodiment, and is equivalent to a sectional view of a portion of FIG. 3 taking along the line IV-IV.

Subsequently, a covering portion 235 according to the second variant example of the embodiment is described.

FIG. 9 is a perspective view of a covering portion according to a second variant example of the embodiment. FIG. 10 is view illustrating the covering portion according to the second variant example of the embodiment, and is equivalent to a cross sectional view of a portion of FIG. 3 taking along the line IV-IV.

In the embodiment shown in FIG. 5, the fixing portion 36 is integrally formed as a portion of the covering portion 35. Upon comparison, the second variant example of the embodiment shown in FIG. 9 differs from the embodiment in that: a fixing portion 236, and a body portion 239 of a covering portion 235 are separately formed.

As shown in FIG. 9 and FIG. 10, the covering portion 235 includes: the body portion 239, formed by a pair of first skin materials 237; and the fixing portion 236, functioning as another component to be mounted at a front end of the body portion 239. For example, the first skin material 237 is a material the same as that of a seat cover 25, such as a cloth material (fabric), synthetic leather, and natural leather. The pair of first skin materials 237 is of a substantially same shape and size, and in a state that the pair of first skin materials 237 overlaps, peripheral portions are sewed. Front end portions of the first skin materials 237 are folded towards inner sides, and in a state that the preformed fixing portion 236 is wrapped between the front end portions of the first skin materials 237, the front end of the body portion 239 is sewed.

The fixing portion 236 is of a width the same as that of the body portion 239, and extends from the front end of the body portion 239. The fixing portion 236 is formed by a pair of second skin materials 240, and an elastic material 238 disposed between the pair of second skin materials 240. For example, the second skin material 240 is made of a cloth material (fabric), synthetic leather, natural leather, nonwoven fabric formed by needle punch, or the like. The pair of second skin materials 240 is of a substantially same shape and size, and is in the following state: front end portions of the second skin materials 240 are sewed, and the second skin materials 240 are reversed in a manner that sewed portions are located at inner sides of the second skin materials 240.

The elastic material 238 is disposed between the pair of second skin materials 240 at the front end of the fixing portion 236. The elastic material 238 extends along a width direction of the fixing portion 236. The pair of second skin materials 240 is sewed along the width direction (the car width direction) of the fixing portion 236 at a position closer to, as compared with a portion provided with the elastic material 238, a base end. Therefore, the thickness of the front end of the fixing portion 236 increases the thickness generated by the arrangement of the elastic material 238, and blocks the front end of the fixing portion 236 at the block portion 32 of the wire 31.

In this way, according to this variant example, the preformed fixing portion 236 can be mounted at the body portion 239 of the covering portion 235. Therefore, the fixing portion 236 can be effectively manufactured. Therefore, a low-cost seat device can be provided.

Further, the disclosure is not limited to the embodiments that are described with reference to the accompanying drawings, and variant examples within the technical scope of the disclosure may be took into consideration.

For example, in the embodiments, the right seat 13A of the back row seat 13 is used as an example of the seat device for description. Because the right seat 13A and the left seat 13B are symmetrically formed, the left seat 13B also adopts the seat device of the disclosure. In addition, the seat device of the disclosure may be applied to the front row seat 12.

Besides, in the embodiments, the right seat 13A is a portion of the back row seat 13 that is a bench seat allowing a plurality of passengers to sit, but the disclosure is not limited thereto, the right seat may be a seat that allows one passenger to sit. Also, the left seat 13B may be a seat that allows one passenger to sit.

In addition, in the embodiments, the covering portion 35 is mounted at the seat cushion 21, but the disclosure is not limited thereto, the covering portion may be mounted at the seat backrest 22.

In addition, in the embodiment, the opening portion 33 is formed between the seat cushion 21 and the seat backrest 22, but the disclosure is not limited thereto, for example, the opening portion may be disposed at a front surface of the seat backrest 22.

Besides, structural elements in the embodiments can be replaced by well-known structural elements without departing from the scope of the principles of the disclosure. It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A seat device, comprising:
   wires, fixed at any one of a seat frame and a car body, and adapted to fix a child seat;
   opening portions, disposed at a seat, and adapted to enable the child seat to be connected to the wires; and
   covering portions, one end of each being mounted at the seat at a front of each opening portion in a car front-rear direction, the other end being a free end, and the covering portions covering the opening portions, wherein
   the wires are located behind the opening portions,
   each of the covering portions comprises a fixing portion disposed at the other end, and the fixing portion is fixed by being clamped by the seat and one of the wires.

2. The seat device according to claim 1, wherein
the opening portions are disposed at two sides of the seat in a car width direction respectively, and
the covering portions are formed in a manner of covering the opening portions respectively.

3. The seat device according to claim 2, wherein
each of the covering portions is made of a skin material, and
the fixing portion is formed by folding back a front end portion of the skin material.

4. The seat device according to claim 2, wherein
each of the covering portions comprises an elastic material at the other end, and
each of the fixing portions comprises a constricted neck portion located where the elastic material at the other end is sewed and formed in a constricted shape.

5. The seat device according to claim 2, wherein
each of the fixing portions is a separate component and mounted at a body portion of one of the covering portions.

6. The seat device according to claim 1, wherein
each of the covering portions is made of a skin material, and
the fixing portion is formed by folding back a front end portion of the skin material.

7. The seat device according to claim 1, wherein
each of the covering portions comprises an elastic material at the other end, and
each of the fixing portions comprises a constricted neck portion located where the elastic material at the other end is sewed and formed in a constricted shape.

8. The seat device according to claim 1, wherein
each of the fixing portions is a separate component and mounted at a body portion of one of the covering portions.

9. The seat device according to claim 1, wherein
the seat comprises a seat cushion and a seat backrest obliquely connected to a rear end portion of the seat cushion, and the fixing portion is clamped between the seat cushion and one of the wires so as to be fixed.

* * * * *